Oct. 18, 1966  H. KRAUSE  3,279,737
SEAT SLIDE CONSTRUCTION
Filed April 13, 1964  2 Sheets-Sheet 1
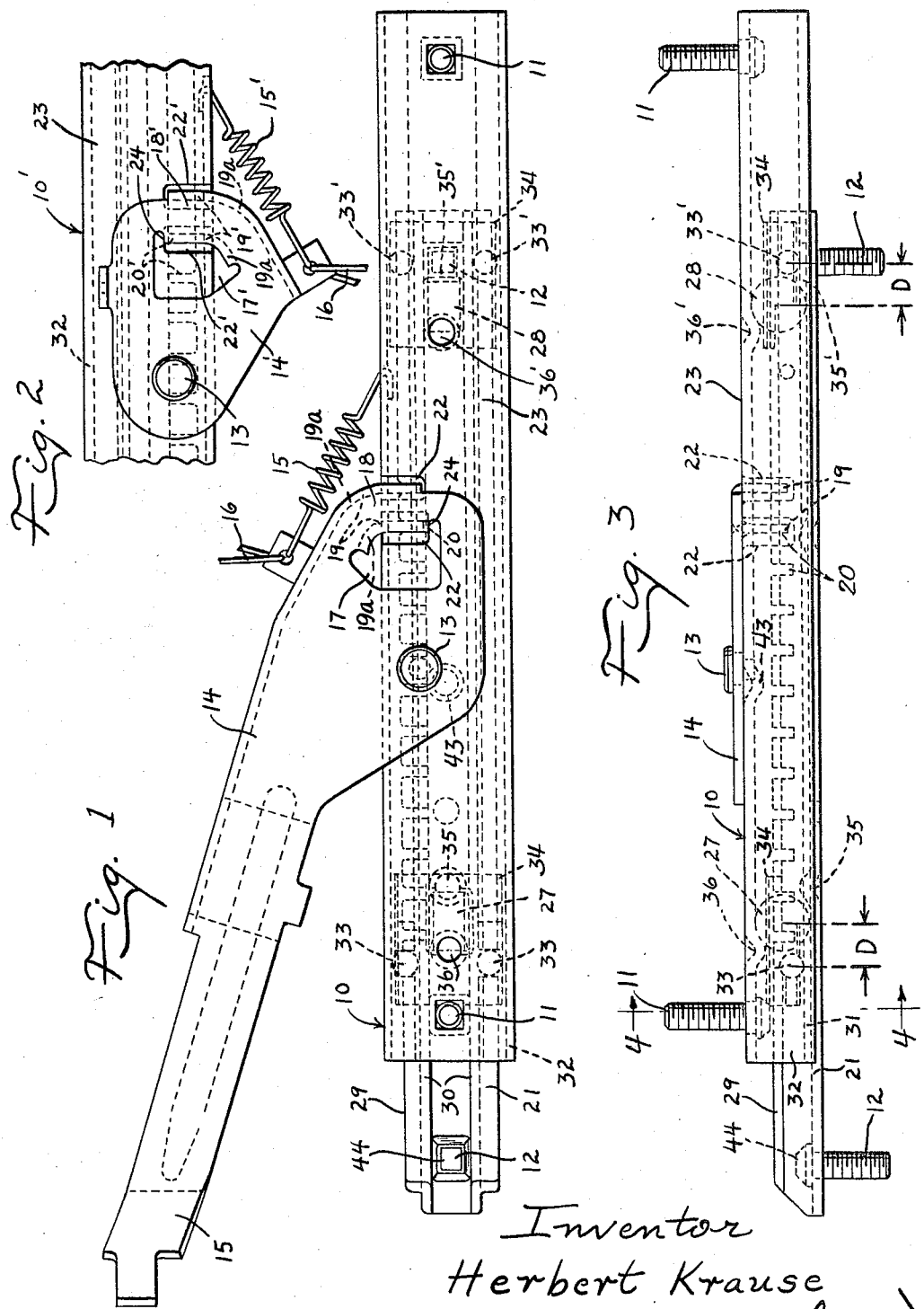
Inventor
Herbert Krause
Attorney Oct. 18, 1966  H. KRAUSE  3,279,737
SEAT SLIDE CONSTRUCTION
Filed April 13, 1964  2 Sheets-Sheet 2

Inventor
Herbert Krause
Attorney

United States Patent Office 3,279,737
Patented Oct. 18, 1966

3,279,737
SEAT SLIDE CONSTRUCTION
Herbert Krause, Rockford, Ill., assignor to Atwood Vacuum Machine Company, Rockford, Ill., a corporation of Illinois
Filed Apr. 13, 1964, Ser. No. 359,380
2 Claims. (Cl. 248—430)

This invention relates to seat slide structures for use with adjustable seats for vehicles such as automobiles and trucks.

The principal object of my invention is to provide improved latching means for locking the seat securely in adjusted positions, the latch members of my invention having generally U-shaped slot engaging end portions with the legs of the U spaced the same as the slots in the track so that a double locking engagement is made possible for greatly reduced wear and tear on the working parts and less likelihood of any eventual looseness and consequent rattle, the latch member being made even stronger by virtue of a reinforcing channel, formation that is coextensive with one end of the main channel and curved in transverse relationship thereto, there being a real need for such heavy duty latching means now that seat belts are coming into general use and the loads imposed on seat latches are greatly increased.

The invention is illustrated in the accompanying drawings, in which—

FIG. 1 is a plan view of the left-hand one of a pair of seat slide structures made in accordance with my invention, the right-hand one being substantially a duplicate, the principal difference being in the form of its latch which is operated by cross-connection with the latch on the left-hand seat slide structure in the usual way, so that a plan view of only that much of the right-hand slide structure is illustrated in FIG. 2;

FIG. 3 is a side view of FIG. 1;

Similar reference numerals are applied to corresponding parts throughout these views.

Figure 7:
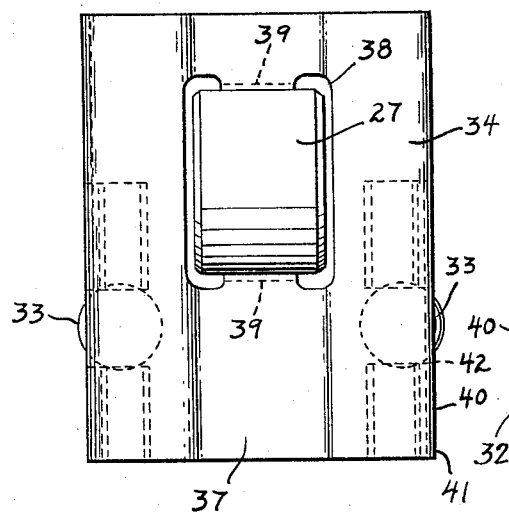
FIGS. 5, 6 and 7 are, respectively, a side view, front view and plan view of the two balls and roller retainer, shown about twice size.
Figure 4:
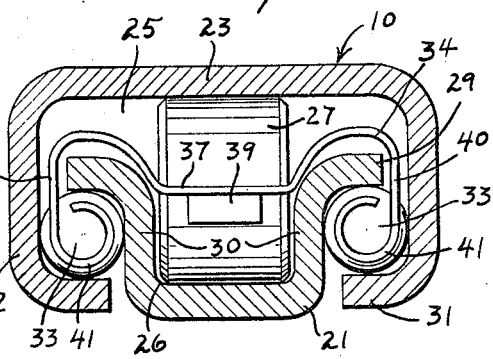
FIG. 4 is a cross-section on the line 4—4 of FIG. 3.
Figure 6:
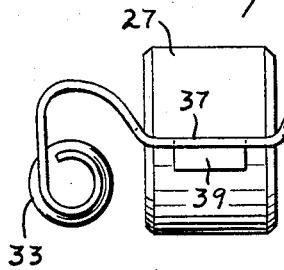
Figure 5:
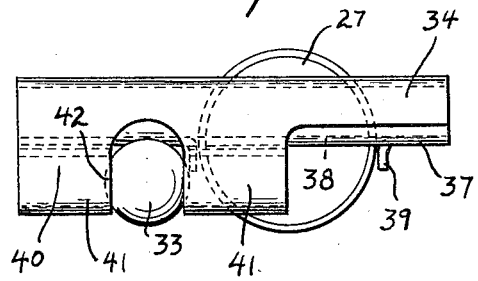

Referring to the drawings, a seat slide structure embodying the improvements of my invention is indicated generally by the reference number 10 in FIGS. 1, 3 and 4, a similar one being indicated generally by the reference numeral 10' in FIG. 2, two of these structures being provided in connection with each seat, attached to the bottom of the seat by means of bolts 11 or in any other suitable manner and secured to and supported on the floor on suitable brackets to which the seat slide structures are secured by means of other bolts 12. Both seat slide structures of a pair have latches pivoted thereon as indicated at 13, the latch 14 for the left-hand seat slide structure including a hand lever 15 on the front end thereof for operating latches 14 and 14' together against the resistance of their return springs 15 and 15', the two latches being interconnected in the usual way by means of a cross-connecting link 16. The latches 14 and 14' are both stamped from sheet metal and have perforated portions 17 and 17' to enable providing the portions 18 and 18' of channel or U-shaped cross-section the two legs 19 and 19' of which define two spaced latch teeth to operate in correspondingly spaced slots 20 and 20' provided in one side of the lower channel member 21 of each seat slide structure to enable double locking engagement with both latches 14 and 14'. A pair of notches 22 is provided in one side of the upper channel member 23 to accommodate the teeth 19, and similar notches 22' are provided in the upper channel in the other seat slide structure 10', the inner ends of the notches 22 and 22' forming stops for abutment by one tooth of each pair, as indicated at 24, to limit oscillation of the levers 14 and 14' under action of their springs 15 and 15' in the locking of the seat. The latches are made stronger by virtue of a reinforcing channel formation 19a coextensive with one end of the main channel and curved in transverse relationship thereto. It is manifest, therefore, that with double locking engagement of the latch means on both seat slide structures there is sufficient added strength to assume the greater load involved when seat belts are attached to the seat as so many are, and, whether or not seat belts are employed, the present improved construction means very little if any added cost and gives assurance of greatly prolonged wear and much less likelihood of any looseness developing and causing rattling.

The upper and lower slide members 23 and 21 are of rolled or stamped sheet metal construction for lightness and economy and also strength and rigidity, and are formed to provide opposing channels 25 and 26 in which two cylindrical bearing rollers (or balls) 27 and 28 operate to maintain the slide members in a normal spaced relationship, the lower slide member having outwardly bent flanges 29 on the upper edges of its vertical side walls 30, and the upper slide member having inwardly bent flanges 31 on the lower edges of its vertical side walls 32 to define horizontal raceways between these flanges for a pair of bearing balls 33 to guide the upper slide member for movement in a straight line relative to the lower slide member, the roller 27 having two balls 33 associated therewith and the roller 28 likewise having two balls 33' associated therewith as clearly illustrated in FIGS. 1 and 3, the rollers and balls being forced in between the upper and lower slide members so that the inherent resilience or springiness in the sheet metal employed in the slide members serves to maintain the rollers and balls under a compressive load or "preload" to eliminate any likelihood of rattle. A thin walled cage or retainer 34 maintains the balls 33 in forwardly offset relationship to the roller 27 to the extent clearly shown in FIGS. 1 and 3 so that at the limit of rearward adjustment of the slide 23, when the roller (or ball) 27 strikes the stop 35 on the lower slide or track 21 and a similar stop 36 on the upper slide 23, the balls 33, being spaced forwardly the dimension D, are forwardly spaced with respect to the foremost one of the slots 20 and that one of the balls 33 on the slotted side of the lower slide or track 21 cannot drop into the front slot in this extreme position of rearward adjustment of the seat. By this offsetting of the balls 33 with respect to the roller (or ball) 27 I have also achieved several other important advantages:

(1) Approximately an inch longer seat travel, namely, five inches travel as against only four inches travel heretofore possible;

(2) The triangular arrangement of the two spaced balls 33 in forwardly offset relation to the roller (or ball) 27 and the corresponding rearward offsetting of balls 33' in relation to the other roller (or ball) 28 makes for much better load distribution, and (3) With the improved load distribution goes reduced wear and easier sliding action.

The rear roller (or ball) 28 cooperates with a stop 36' on the upper slide 23 and with a stop 35' on the lower slide or track 21 supplied by the head of the rear bolt 12.

Each cage 34 has a generally channel shaped middle portion 37 in the web of which a generally rectangular opening 38 is provided having parallel downwardly bent lugs 39 at the front and back ends for close confinement of the roller (or ball) 27 in a horizontal plane through the axis or center of the roller (or ball). The opposite side portions 40 of each cage 34 extend downwardly between the flanges 29 of the lower slide or track 21 and the side walls 32 of the upper slide 23 and have curled, generally cylindrical, lower end portions 41 forwardly from the center of the roller (or ball) 27, and rearwardly from the center of the roller (or ball) 28, these curled cylindrical portions 41 being cut away intermediate their ends as at 42, to a dimension slightly less than the diameter of the balls 31 (or 31') to enable rotatably mounting the balls in the circular bearings formed in the cylindrical portions 41 on opposite sides of the cut away portions 42, the balls being snapped into place and the inherent springiness or resilience of the metal employed in the cages 34 eliminating any likelihood of any deformation of the cages in assembling the balls therein in this manner.

In operation, each seat slide structure 10 and 10' is preloaded in the assembling thereof to insure the desired tightness and avoid the likelihood of any chuck or wobble and consequent rattle developing in the use of the seat slide. Sufficient lubricant is applied at the time of assembly to last the life of the seat slide structures to insure smooth, quiet and easy operation at all times. I have indicated above that the rearward limit of adjustment of the seat is when the stop projections 36 and 36' on the upper slide 23 come into engagement with the rollers (or balls) 27 and 28, the latter coming into contact with stop projections 35 and 35' on the lower slide or track 21. The forward limit of adjustment of the seat is when the projection 43 on the upper slide 23 engages roller (or ball) 27 and the latter strikes the stop projection 44 provided by the head of the front bolt 12. The latches 14 and 14' by virtue of their U-shaped slot engaging end portions 18 and 18' with the legs 19 and 19' spaced the same as the slots in the track provide a double locking engagement for greatly reduced wear and tear on the working parts and less likelihood of any eventual looseness and consequent rattle, the latches being made even stronger by virtue of the reinforcing channel formation 19a coextensive with one end of the main channel and curved in transverse relationship thereto, thereby meeting the real need for such heavy duty latching means now that seat belts are coming into general use and the loads imposed on seat latches are thereby greatly increased.

It is believed the foregoing description conveys a good understanding of the objects and advantages of my invention. The appended claims have been drawn to cover all legitimate modifications and adaptations.

I claim:
1. In a seat slide structure comprising an elongated stationary horizontal lower slide member, an elongated horizontal seat supporting upper slide member slidably supported on said lower slide member in telescoping relation thereto, and a latch member pivoted on a vertical axis on top of said upper slide member engaging selectively in notches provided in uniformly spaced relation in the top of said lower slide member, the improvement which consists in the provision on said latch member of a plurality of downwardly projecting vertical teeth in spaced parallel relation, the spacing of said teeth corresponding to the spacing of the aforesaid notches, the teeth being engageable in a plurality of notches, whereby to distribute the load on said teeth and notches and thereby insure better holding action in the event of any unusual strain tending to cause relative longitudinal movement between said slide members, two of said neighboring teeth being defined by the side walls of an integral channel shaped portion of the latch member.

2. A slide structure as set forth in claim 1, wherein the latch member is of stamped sheet metal construction and has formed integral therewith and coextensive with one end of said teeth and first-mentioned channel two other vertical walls projecting downwardly from said latch defining opposite sides of another integral channel shaped portion of said latch extending in transverse relation to the first-mentioned channel shaped portion in which the notch-engaging teeth are formed.

References Cited by the Examiner

UNITED STATES PATENTS

| 2,195,349 | 3/1940 | Woina | 248—430 |
| 2,679,889 | 6/1954 | Barden et al. | 308—3.8 |
| 2,970,015 | 1/1961 | Ragsdale | 308—6 |
| 3,076,629 | 2/1963 | Henry-Biabaud | 248—424 |

FOREIGN PATENTS 244,137    3/1963    Australia.

CLAUDE A. LE ROY, *Primary Examiner.*

R. P. SEITTER, *Assistant Examiner.*